United States Patent
Lüde et al.

(10) Patent No.: US 8,678,415 B2
(45) Date of Patent: *Mar. 25, 2014

(54) LOWER LEG FOR A SUSPENSION FORK

(71) Applicant: Gustav Magenwirth GmbH & Co. KG, Bad Urach (DE)

(72) Inventors: Dirk Lüde, München (DE); Reiner Künstle, Metzingen (DE)

(73) Assignee: Gustav Magenwirth GmbH & Co. KG, Bad Urach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/845,296

(22) Filed: Mar. 18, 2013

(65) Prior Publication Data

US 2013/0241171 A1    Sep. 19, 2013

Related U.S. Application Data

(63) Continuation of application No. 12/714,650, filed on Mar. 1, 2010, now Pat. No. 8,439,381, which is a continuation of application No. PCT/EP2008/007020, filed on Aug. 27, 2008.

(30) Foreign Application Priority Data

Aug. 29, 2007    (DE) .................. 10 2007 040 887

(51) Int. Cl.
    *B62K 25/08*    (2006.01)
(52) U.S. Cl.
    CPC ..................... *B62K 25/08* (2013.01)
    USPC ....................................................... 280/276

(58) Field of Classification Search
    USPC .......................... 280/276, 279, 280; D12/118
    See application file for complete search history.

(56) References Cited

U.S. PATENT DOCUMENTS

| | | | |
|---|---|---|---|
| 5,078,417 A | 1/1992 | Mouritsen | 280/280 |
| 5,562,297 A | 10/1996 | Lin | 280/276 |
| 5,653,007 A | 8/1997 | Boyer et al. | 29/460 |
| 6,260,870 B1 | 7/2001 | Fan | 280/276 |
| 6,439,077 B2 | 8/2002 | Lumpkin et al. | 74/502.4 |
| 6,592,108 B1 | 7/2003 | Lude | 267/64.28 |
| 7,621,549 B2 | 11/2009 | Van Houweling | 280/288.4 |

FOREIGN PATENT DOCUMENTS

| | | |
|---|---|---|
| CH | 612889 | 8/1979 |
| DE | 899444 | 10/1953 |
| DE | 2746879 | 4/1979 |
| DE | 7932413 | 2/1980 |
| DE | 3437052 | 4/1986 |
| DE | 29615349 | 11/1996 |
| DE | 19531844 | 3/1997 |
| DE | 20212876 | 11/2002 |
| GB | 713413 | 8/1954 |
| GB | 2 389 349 A | 12/2003 |
| TW | 229545 | 9/1994 |
| TW | M262438 U | 4/2005 |
| TW | M272732 U | 8/2005 |

*Primary Examiner* — Paul N Dickson
*Assistant Examiner* — Wesley Potter
(74) *Attorney, Agent, or Firm* — Alan Kamrath; Kamrath IP Lawfirm, P.A.

(57) ABSTRACT

A lower leg (1) for a suspension fork has two tubes (2, 3) with, in each case, a receptacle device (4, 5) for receiving a stanchion tube displaceably mounted in the receptacle device. Two stabilizers (6, 7) connect those end regions of the two tubes which are opposite the dropouts of the tubes to one another. The lower leg (1) has a stiffening member (8, 9) which connects the two stabilizers to one another.

31 Claims, 11 Drawing Sheets

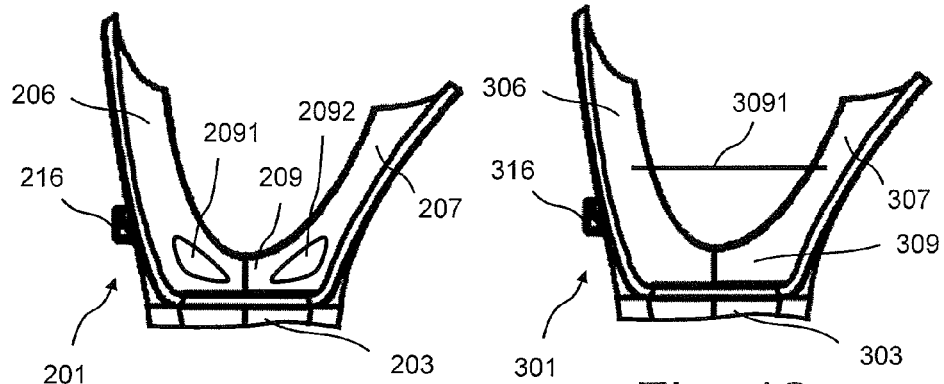
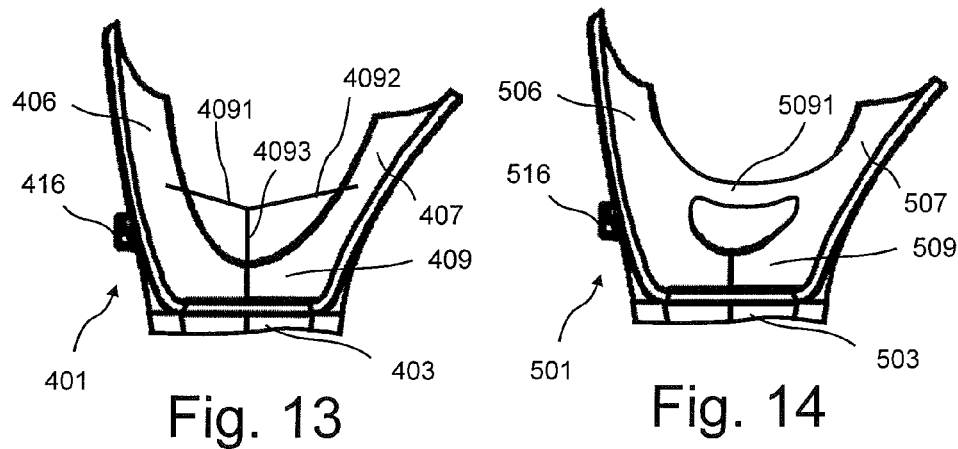
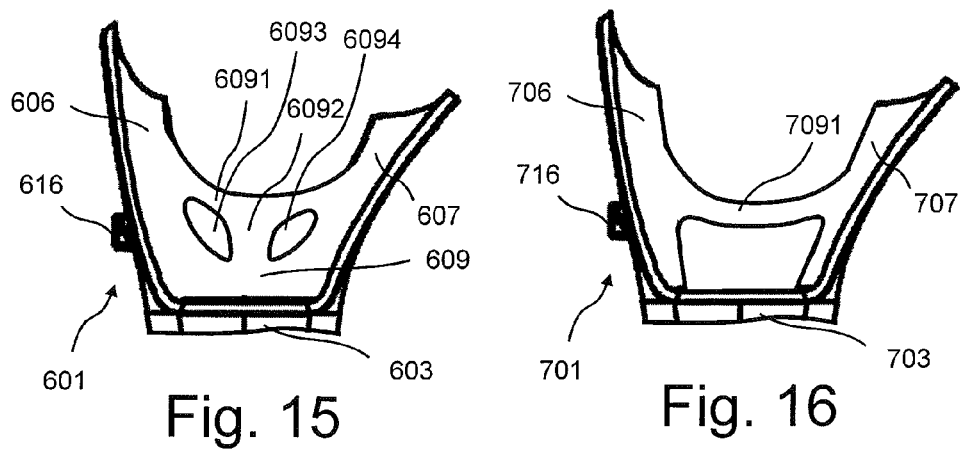

LOWER LEG FOR A SUSPENSION FORK

CROSS REFERENCE

The present application is a continuation of U.S. patent application Ser. No. 12/714,650 filed Mar. 1, 2010, which is a continuation of International Application No. PCT/EP2008/007020 filed Aug. 27, 2008.

The invention relates to a lower leg for a suspension fork and a suspension fork having such a lower leg.

In relation to the present description and the present claims, a "suspension fork" means a bicycle fork or motorcycle fork which has two tubes which each receive a stanchion tube with suspension. The dropouts of the tubes have a device for receiving the axle of a wheel (usually the front wheel, but reception of the rear wheel is also conceivable in the case of unconventional frames). The stanchion tubes are displaceably mounted in the tubes, with suspension and damping being provided in order to absorb or to damp shocks occurring during riding. Depending on the riding situation, the suspension or damping may be adjustable or capable of being switched off or switched on.

In relation to the present description and present claims, a "lower leg" means the lower assembly of the suspension fork, which substantially comprises the two tubes. The two tubes are connected via one or more stabilizers in order to achieve a certain torsional rigidity of the lower leg with respect to the torsional forces and reflexural forces occurring during riding and, in particular, during compression, such as while riding around curves, landing or jumping. The stabilizers connect, as a rule, the upper ends of the tubes. In each case, dropouts, which each have a receptacle for the axle of the wheel, are provided at the other ends of the tubes.

A lower leg for a suspension fork is disclosed in DE 195 31 844 A1. The lower leg has two tubes having in each case a dropout. In the case of this known lower leg for a suspension fork, two stabilizers (fork bridges 7) which rigidly connect the two tubes to one another are provided. For this purpose, the two tubes have, at their respective upper ends, in each case a tube extension via which the two stabilizers are firmly connected to one another. These tube extensions are mounted on the tubes and firmly connected to them. In the case of the known lower leg, a certain torsional rigidity is achieved by the provision of the two stabilizers.

However, the known lower leg has the disadvantage that, in the transition regions from the stabilizers to the tube extensions, stress peaks occur and lead to a high load. The transition regions must therefore be very stable and hence heavy in order to avoid a stress fracture. In extreme riding situations, damage to the lower leg may also occur.

It is therefore the object of the invention to provide a lower leg for a suspension fork in which, in spite of a low-weight design, the stress peaks occurring during riding are relatively small compared with the prior art.

According to one embodiment of the invention, a lower leg for a suspension fork having two tubes with, in each case, a receptacle device for receiving a stanchion tube displaceably mounted in the receptacle device and with two stabilizers which connect those end regions of the two tubes which are opposite the dropouts of the tubes to one another is provided, with the lower leg having a stiffening device which connects the two stabilizers to one another.

In the case of embodiments which have more than two stabilizers, it is intended according to the invention that at least two of the stabilizers be connected to one another. Advantageously, in the case of more than two stabilizers, stiffening devices are provided which in each case connect at least two stabilizers to one another and are preferably formed according to the advantageous further developments mentioned below.

According to the prior art, the two stabilizers are rigidly connected to one another at their ends only via the tubes. By the stiffening device according to the invention, additional strength and/or rigidity is achieved. The stiffening device can preferably also be connected to the upper ends of the two tubes. Alternatively, the stiffening device can be connected only to the two stabilizers. In this case, it is preferable if the two stabilizers are, connected not with a sharp edge but with a radius to the two tubes. The radius should be at least about 3 mm and preferably at least about 5 mm.

In principle, the lower leg according to the invention of the suspension fork can also have more than one tube on one or both sides of the wheel to be arranged therein, into which tube a stanchion tube of the suspension fork is displaceably held in each case. Such a lower leg is likewise to be covered by the scope of protection of the invention if a stiffening device according to the invention is provided.

According to the invention, the stiffening device may have at least two connecting elements which in each case connect an end of one stabilizer to an end of the other stabilizer and run within the receiving devices for the stanchion tubes, relative to the lower leg.

According to the invention, the stiffening device may have one or more connecting elements which connect the two stabilizers above the tubes to one another.

According to the invention, the connecting elements of the stiffening device may have webs and/or wires.

The webs and/or wires can, according to the invention, also be arranged in the form of a lattice and/or framework, with the arrangement preferably being such that the stresses occurring during riding run as far as possible along the webs and/or wires. In the case of the embodiments comprising webs, the gaps existing between the webs can be left free and/or can be filled by thin surfaces. The thin surfaces are preferably arranged in such a way that the surfaces are arranged on the outside. For visual or other reasons, however, they can also be arranged on the inside or in the middle.

According to the invention, the connecting elements of the stiffening device may comprise webs which are connected to the two stabilizers and in each case one tube.

These embodiments have the advantage that the connecting element can be designed to be particularly light. Preferably, the connecting element can be connected along its entire path to the upper end of a tube.

According to the invention, the connecting elements of the stiffening device may comprise webs which have a smallest height of at least about 0.5 mm, preferably of at least about 1 mm, more preferably of at least about 2 mm, more preferably of at least about 3 mm, more preferably of at least about 5 mm and preferably of approximately at least about 10 mm.

According to the invention, the connecting elements of the stiffening device may comprise webs which have a smallest height of less than about 50 mm, preferably of less than about 40 mm, more preferably of less than about 30 mm, more preferably of less than about 20 mm and preferably of approximately less than about 15 mm.

According to the invention, the connecting elements of the stiffening device may comprise webs which comprise thinner and thicker regions, the thicker regions preferably being provided in those regions of the webs in which greater stresses or loads occur during riding and the thinner regions preferably being provided in those regions of the webs in which smaller stresses or loads occur during riding.

According to the invention, the width or thickness of the connecting elements of the stiffening device and/or the width or thickness of the thicker regions of the connecting elements of the stiffening device may be at least about 0.5 mm, preferably at least about 1 mm, more preferably at least about 2 mm and preferably about 3 mm.

According to the invention, the width or thickness of the connecting elements of the stiffening device and/or the width or thickness of the thicker regions of the connecting elements of the stiffening device may be less than about 10 mm, preferably less than about 8 mm, more preferably less than about 6 mm, more preferably less than about 5 mm, more preferably less than about 4 mm and preferably about 3 mm.

According to the invention, the connecting elements of the stiffening device may comprise webs which comprise recesses, passages and/or thin planar regions and ribs and/or struts, with the ribs and/or struts preferably being provided in those regions of the webs in which greater stresses or loads occur during riding and with the recesses, passages and/or thin planar regions preferably being provided in those regions of the webs in which smaller stresses or loads occur during riding.

According to the invention, the connecting elements of the stiffening device may comprise ribs which preferably run along the edges of the connecting elements.

According to the invention, the lower leg may be formed from a die cast material and/or a plastic material, with the die cast material preferably comprising aluminium die cast material and/or magnesium die cast material, and with the plastic material comprising fibre-reinforced plastic and/or carbon. The fibres of the fibre-reinforced plastic can preferably comprise carbon fibres, glass fibres and/or plastic fibres. More preferably, the direction of the fibres may be substantially unidirectional, with the fibres preferably being oriented along the active stresses or forces. The preferred orientation of the fibres has the advantage that the resultant stresses or forces can be better absorbed and transmitted with formation of torsions which are as small as possible.

According to the invention, the stiffening device may connect the two stabilizers to one another substantially in the middle between the two tubes. The stabilizers are as a rule and preferably arranged centrally relative to the two tubes. According to this embodiment of the invention, it is also possible to state in other words that the connecting element of the stiffening device connects the centres of the two stabilizers to one another. Preferably, this can be effected by a web which, according to one embodiment of the invention, may also be approximately arc-shaped in order to provide the compressed fork bridge with space for compression. Alternatively, the stiffening device can also be formed as a wire. In this case, the stiffening device is effective only in relation to tensile forces, i.e. forces which would move the two stabilizers apart.

According to the invention, the stiffening device can connect the two stabilizers to one another substantially at the lateral ends of the stabilizers.

According to the invention, the stabilizers may comprise connecting bridges which connect the tubes to one another substantially in each case in front of or behind the receptacle devices.

According to the invention, the lower leg may have at least one receptacle device for receiving an actuating line for an adjusting mechanism or braking device. The adjusting mechanism may influence, for example, the spring or damping characteristic of the suspension fork. The entrance may be provided, for example, at the dropout of one tube or both tubes. In this case, it is advantageous to provide the receptacle device for the actuating line (for example a cable pull and/or a pressure line (hydraulic or gas)) on the lower leg, because there is a fixed distance from the receptacle to the entrance.

The braking device may comprise, for example, a brake calliper of a disc brake, which brake calliper is arranged at a dropout of a tube. Mounting on the lower leg has the advantage that the distance between receptacle device and braking device is fixed, and, hence, no line reserve for the actuating line need be provided. According to the invention, the receptacle device can preferably be arranged on the stiffening device. According to this embodiment of the invention, the receptacle device is therefore above the two tubes so that the actuating line can be laid in a concealed manner. Alternatively or in addition, the receptacle device can be arranged on one of the tubes. Of course, a plurality of receptacle devices may also be provided.

The invention is described in more detail below with reference to the working examples shown in the figures.

FIG. 11 shows a partial view of a lower leg according to FIG. 1 with an alternative stiffening device.

FIG. 12 shows a partial view of a lower leg according to FIG. 1 with a further alternative stiffening device.

FIG. 13 shows a partial view of a lower leg according to FIG. 1 with a further alternative stiffening device.

FIG. 14 shows a partial view of a lower leg according to FIG. 1 with a further alternative stiffening device.

FIG. 15 shows a partial view of a lower leg according to FIG. 1 with a further alternative stiffening device.

FIG. 16 shows a partial view of a lower leg according to FIG. 1 with a further alternative stiffening device.

Figure 1:
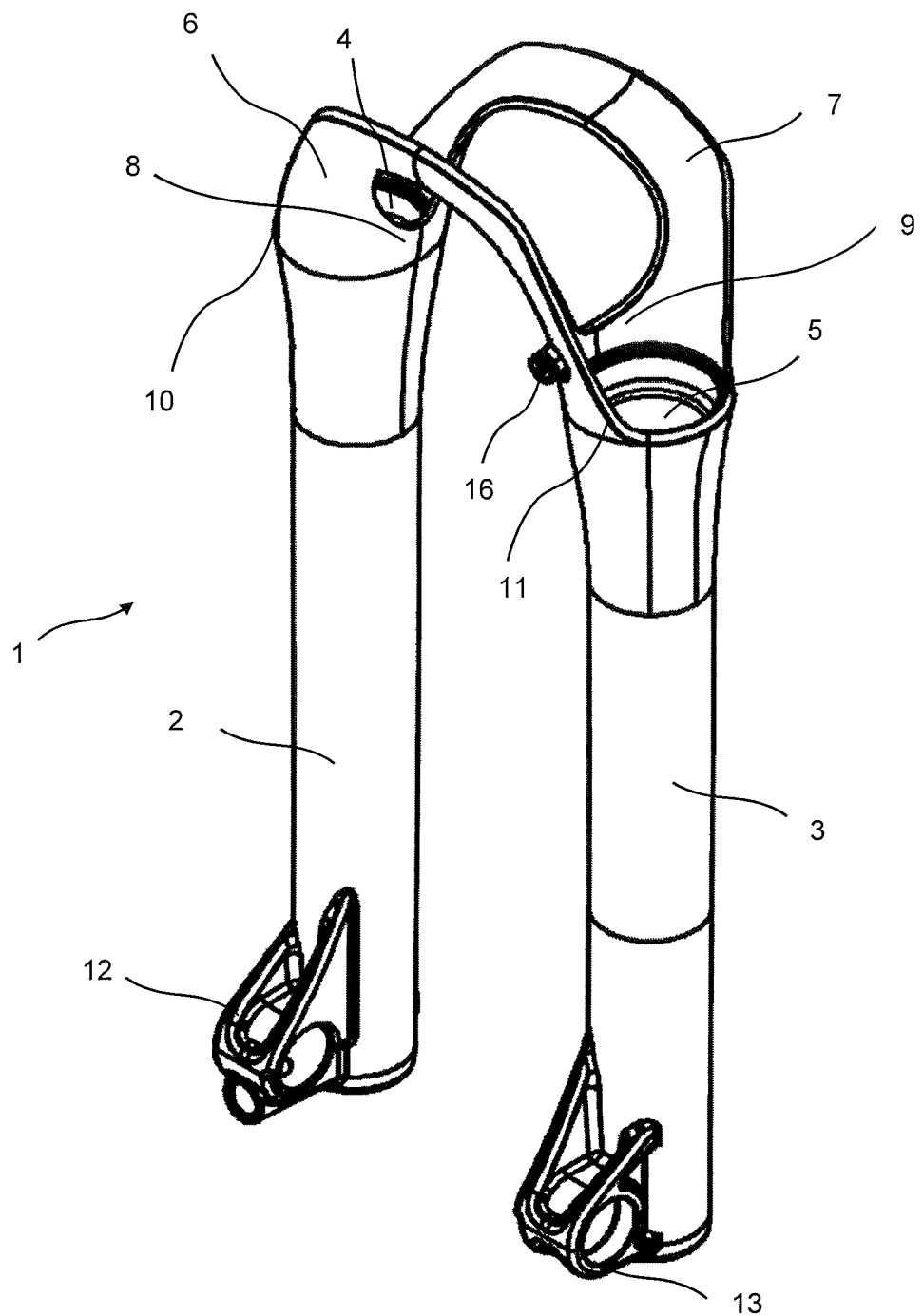
FIG. 1 shows a perspective view of a lower leg according to a first embodiment of the invention from the front top left.
Figure 2:
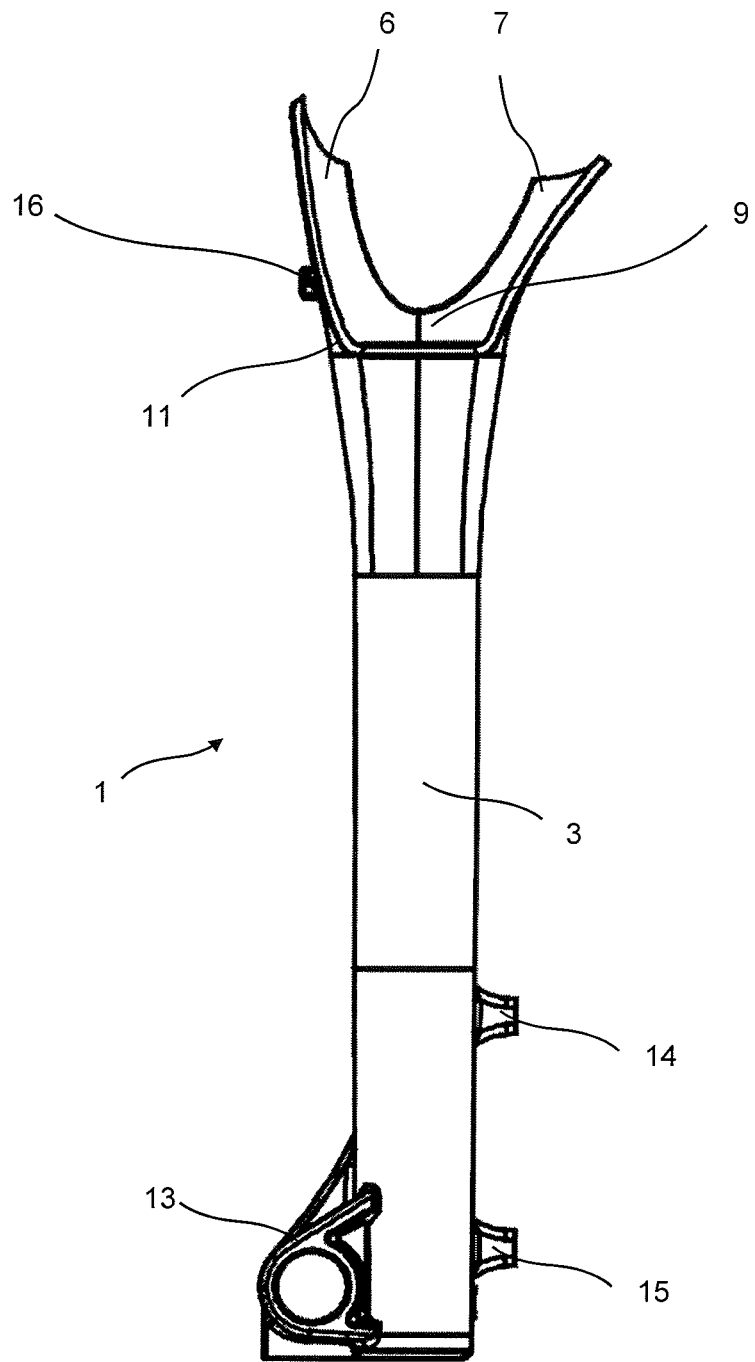
FIG. 2 shows a side view of the lower leg from FIG. 1.
Figure 3:
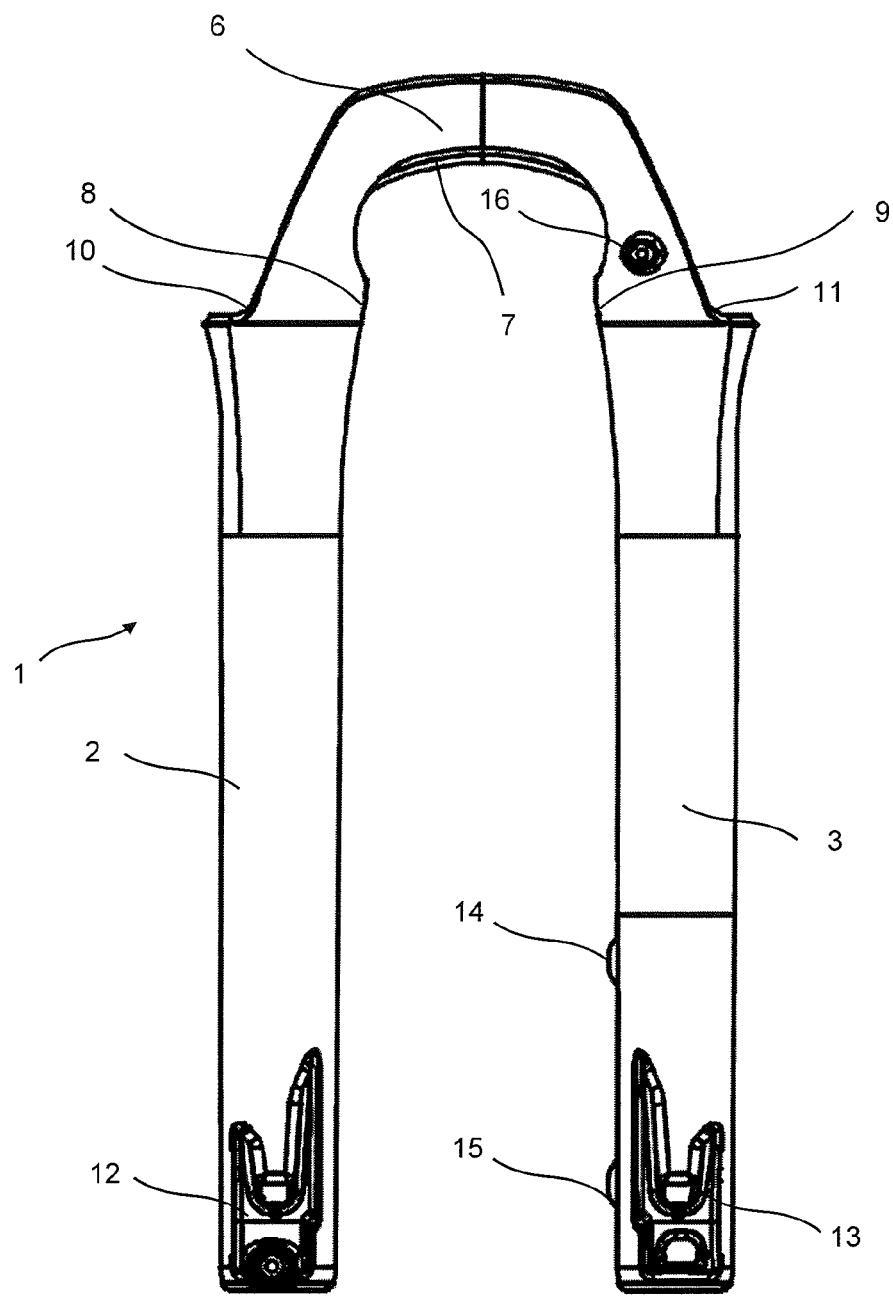
FIG. 3 shows a front view of the lower leg from FIG. 1.
Figure 4:
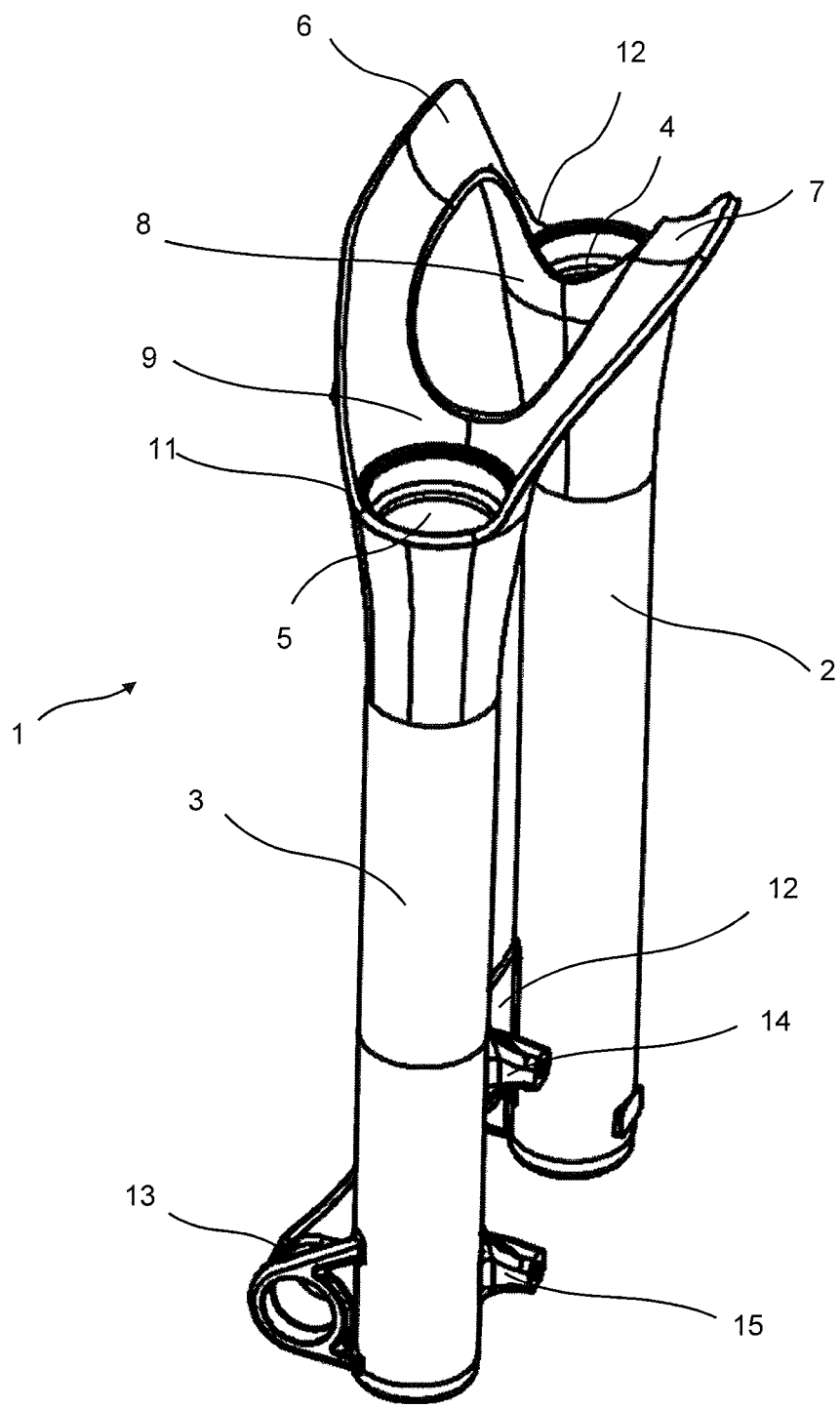
FIG. 4 shows a perspective view of the lower leg from FIG. 1 from the rear top left.

In the description of the working example, the following reference numerals are used:

1 Lower leg
2 Tube
3 Tube
4 Receptacle device for stanchion tube
5 Receptacle device for stanchion tube
6 Front stabilizer
7 Rear stabilizer
8 Stiffening member
9 Stiffening member
10 Reinforcing member
11 Reinforcing member
12 Axle receptacle (at the dropout of tube 2)
13 Axle receptacle (at the dropout of tube 3)
14 Brake calliper receptacle
15 Brake calliper receptacle
16 Receptacle for adjusting device
17 Full-floating axle
18 Stanchion tube 19 Stanchion tube
20 Fork bridge
21 Shaft tube (is held in the steering tube of the bicycle frame)
2091 Recess
2092 Recess
3091 Connecting wire
4091 Connecting wire
4092 Connecting wire
4093 Stiffening wire
5091 Connecting bridge
6091 Connecting bridge
6092 Middle web
6093 Recess
6094 Recess
7091 Connecting bridge In the further working examples or variants, the same reference numerals but incremented by in each case 100 (FIGS. 7 to 10), 200 (FIG. 11), 300 (FIG. 12), 400 (FIG. 13), 500 (FIG. 14), 600 (FIG. 15) or 700 (FIG. 16), are used for corresponding features and elements, unless mentioned explicitly. Reference is made to the description of the other working examples in relation to the common features not described.

Figure 5:
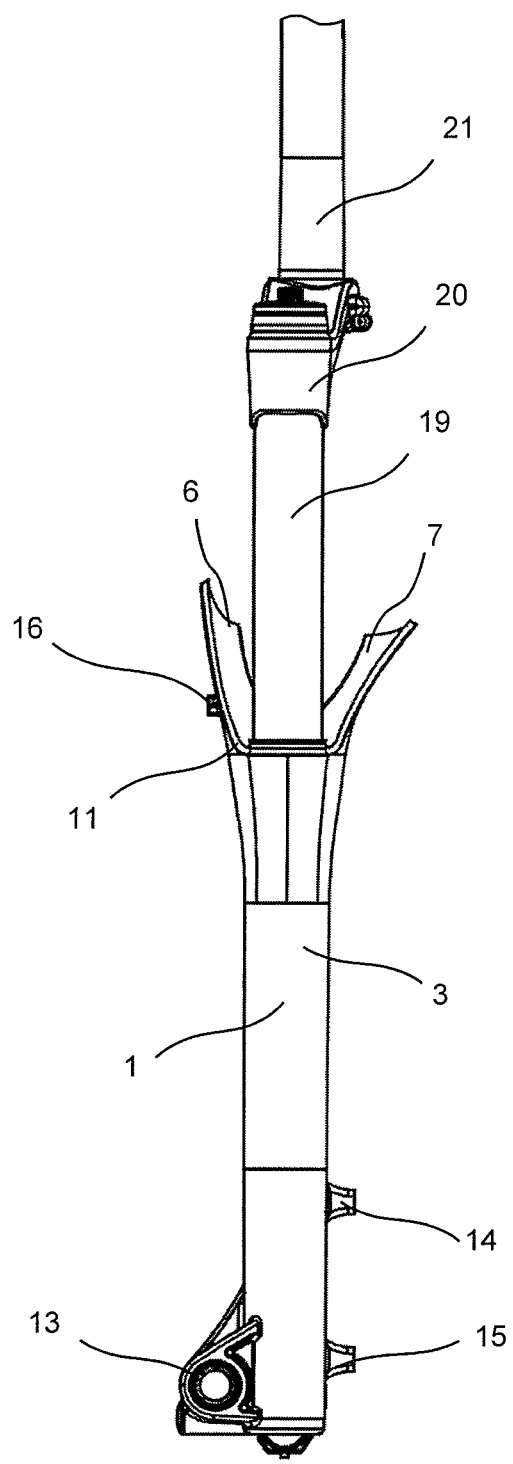
FIG. 5 shows a side view of a suspension fork with the lower leg from FIG. 1.
Figure 6:
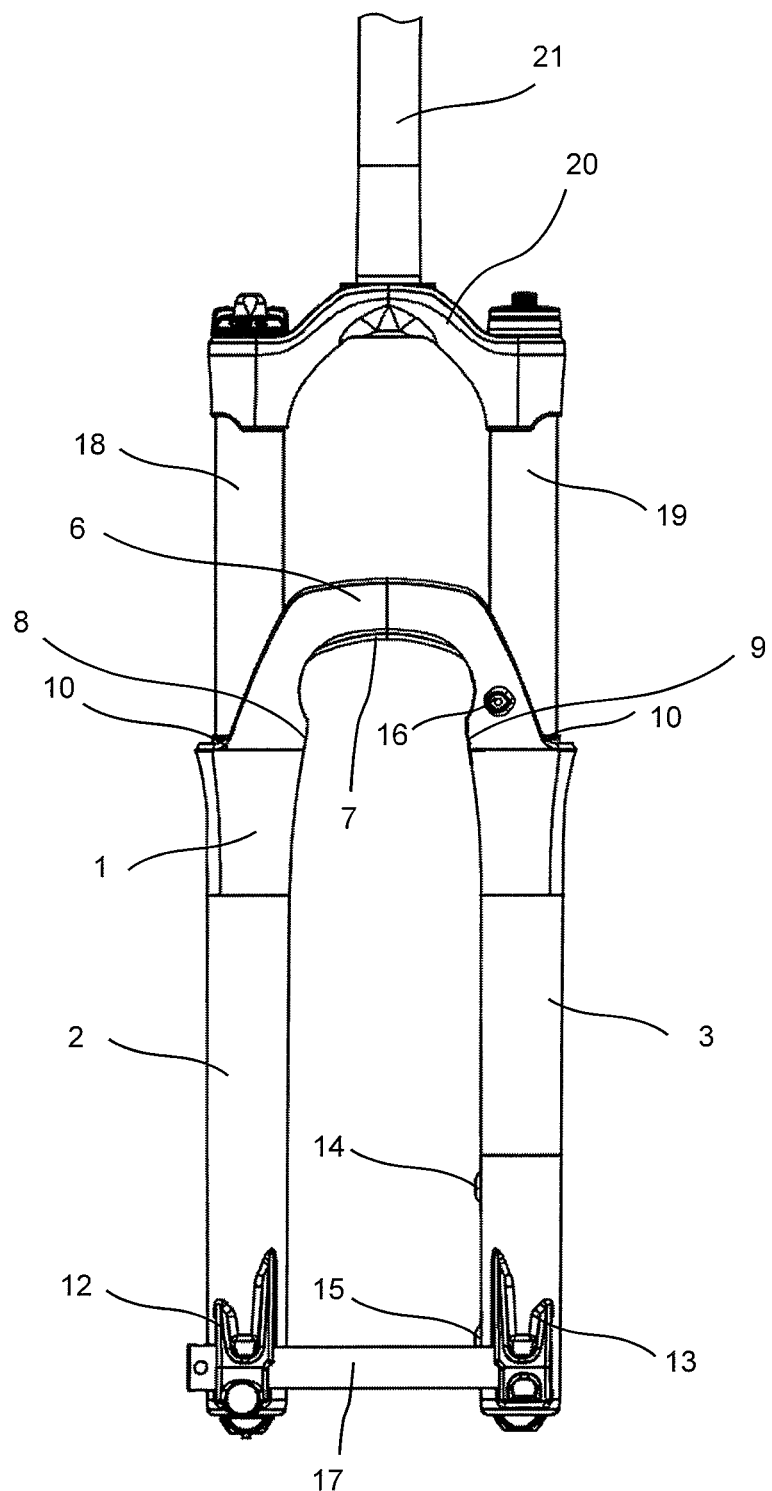
FIG. 6 shows a front view of a suspension fork with the lower leg from FIG. 1.
Figure 7:
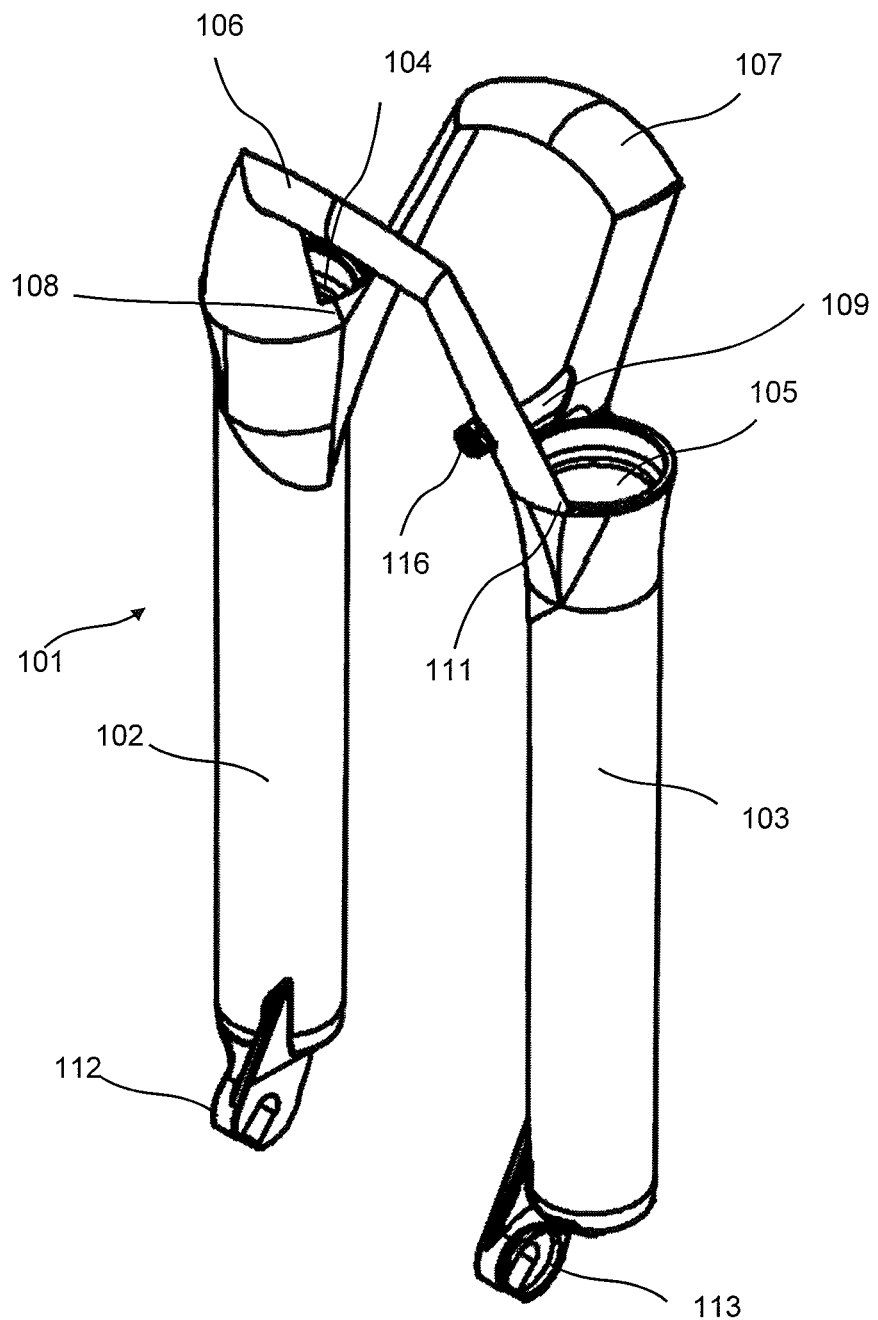
FIG. 7 shows a perspective view of a lower leg according to a further embodiment of the invention from the front top left.
Figure 8:
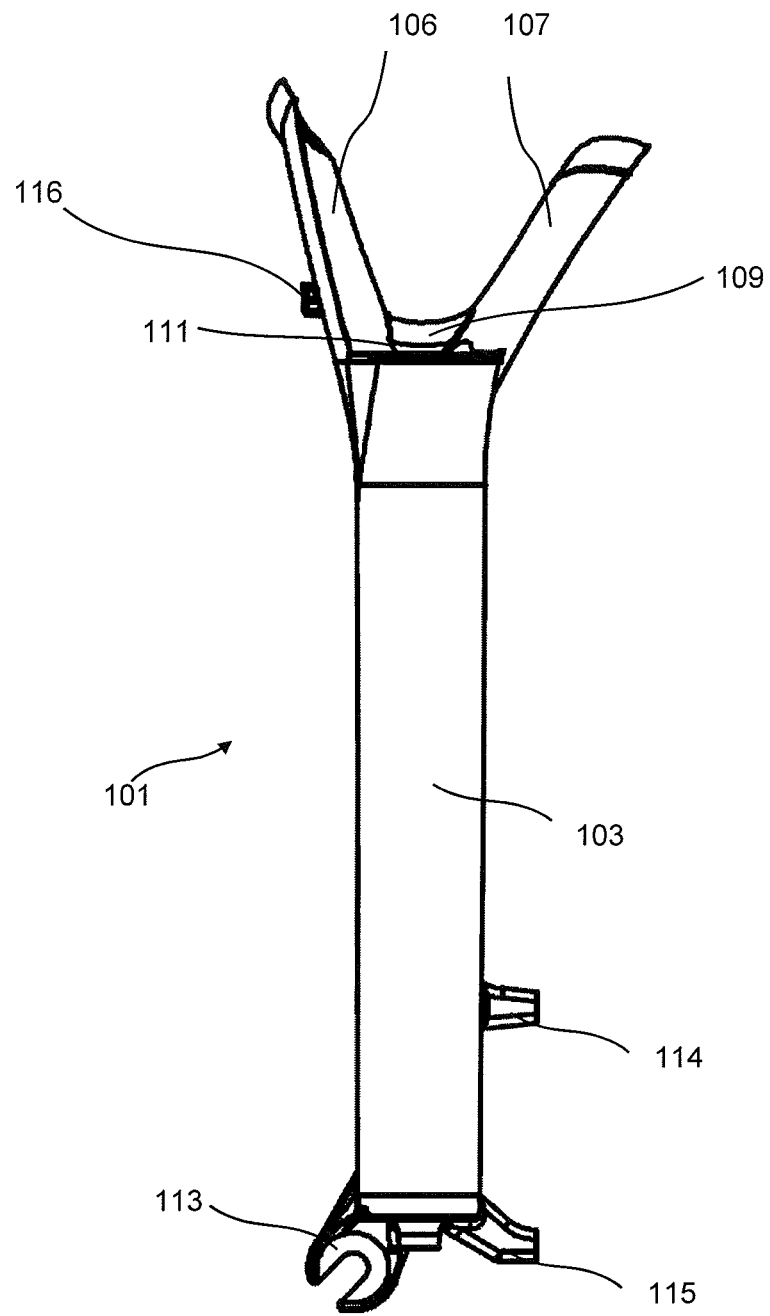
FIG. 8 shows a side view of the lower leg from FIG. 7.
Figure 9:
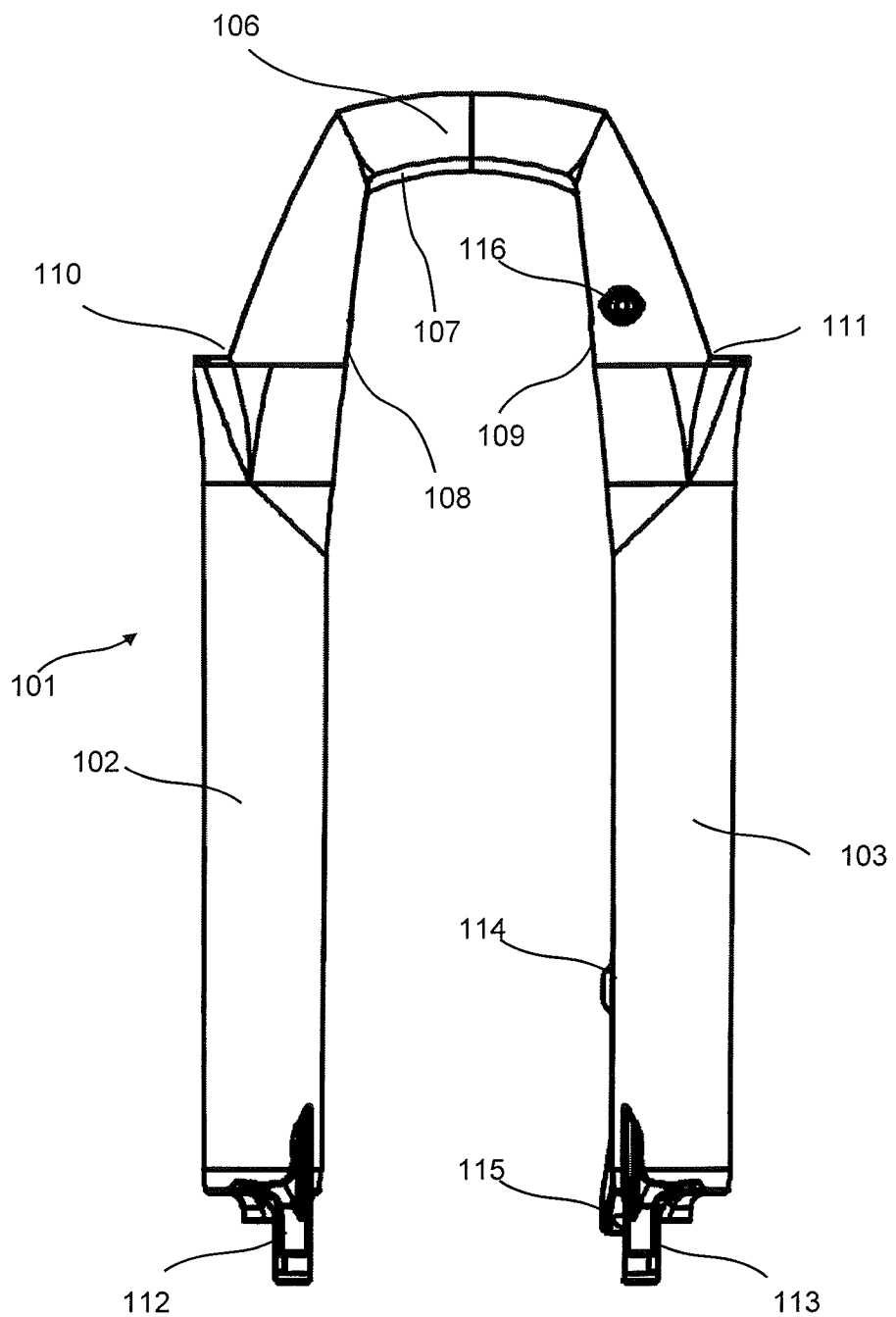
FIG. 9 shows a perspective view of the static component of FIG. 7.
Figure 10:
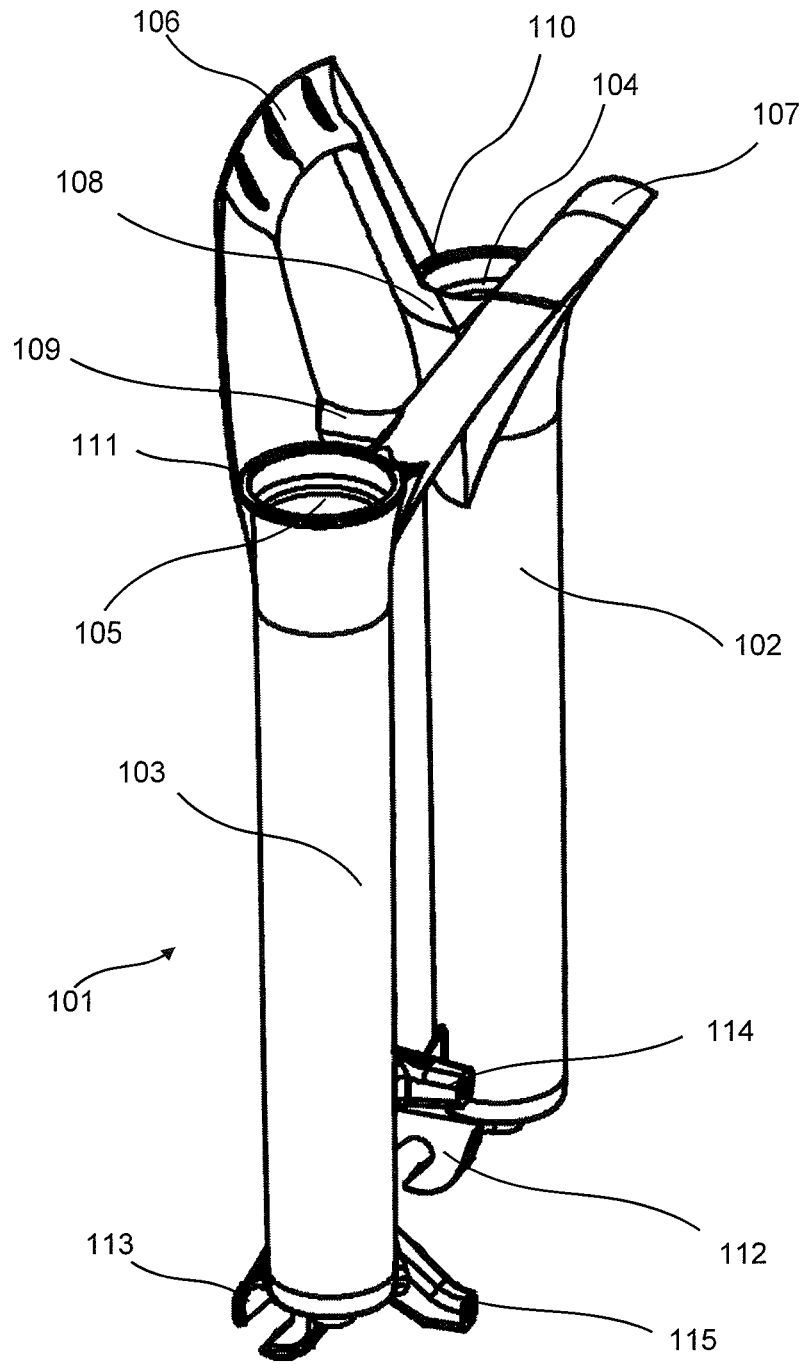
FIG. 10 shows a perspective view of the lower leg from FIG. 7 from the rear top left.

FIGS. 1 to 4 show a lower leg 1 according to a first embodiment of the invention. A suspension fork with such a lower leg is shown in FIGS. 5 and 6.

The lower leg has two tubes 2, 3 which, at their dropouts, comprise in each case an axle receptacle 12, 13 for receiving the full-floating axle 17. Brake calliper receptacles 14, 15 on which a brake calliper can be arranged in a known manner are provided on one of the two tubes. The dimensions are preferably chosen so that a disc brake having a brake disc which has a diameter of 6 inches, a diameter of 7 inches or a diameter of 8 inches can be mounted on the brake calliper receptacles.

At their upper end, the tubes 2, 3 each have a receptacle device 4, 5 for displaceably holding in each case a stanchion tube 18, 19 of the suspension fork. The stanchion tubes are connected in a known manner by a fork bridge 20 to which a shaft tube 21 is fastened.

The shaft tube 21 is arranged in a known manner in a steering tube of a bicycle frame.

The two tubes 2, 3 are connected rigidly to one another by a front stabilizer 6 and a rear stabilizer 7. The front stabilizer runs substantially in front of and the rear stabilizer runs substantially behind the two tubes 2, 3.

The two stabilizers 6, 7 are connected to one another via two stiffening members 8, 9 which constitute the stiffening device according to the invention. The two stiffening members 8, 9 run in each case directly above the two tubes 2, 3 and are also firmly connected thereto. They have a height of 10 mm to 15 mm and a width or thickness of about 3 mm.

Reinforcing members 10, 11 in the form of a rounded section are provided at the outer attachment points of the stabilizers 6, 7. The radius is about 5 mm.

A receptacle device 16 for receiving a hydraulic line for the disc brake to be arranged at the dropout is provided at the front stabilizer 6.

FIGS. 7 to 10 show a lower leg according to an alternative embodiment of the invention. In this embodiment of the invention, the stabilizers 106 and 107 have a fairly angular shape. Moreover, ribs are provided on the front stabilizer 106. Such ribs can also be provided on the rear stabilizer. The axle receptacles 112, 113 are formed for receiving a conventional axle.

In the alternative embodiment according to FIG. 11, recesses 2091, 2092 are provided, in the connecting web 209 of the stiffening device. Corresponding recesses are provided on the other connecting web.

In the alternative embodiment according to FIG. 12, the stiffening device has in each case a connecting wire 3091 in addition to the connecting webs 309.

In the alternative embodiment according to FIG. 13, the stiffening device has in each case connecting wires 4091, 4092 and 4093, which are stretched in the manner of a lattice, in addition to the connecting webs 409.

In the alternative embodiment according to FIG. 14, the stiffening device has in each case a connecting bridge 5091 in addition to the connecting webs 509.

In the alternative embodiment according to FIG. 15, the stiffening device has in each case a connecting bridge 6091 in addition to the connecting webs 609 which connecting bridges are connected to the connecting web 609 via a middle web 6092 in such a way that recesses 6093, 6094 are formed. The recesses can be closed by a thin surface.

In the alternative embodiment according to FIG. 16, the stiffening device has, instead of the connecting web, a connecting bridge 7091 which can also be referred to as connecting web, which is not connected to the tube.

The respective other side not shown in FIGS. 11 to 16 is preferably correspondingly formed.

All embodiments for the invention preferably have a stiffening device formed symmetrically with respect to the central plane of the wheel.

Alternative embodiments are conceivable, in particular a combination and/or further alternatives of the embodiments of the invention which are shown and described in the working examples.

The invention claimed is:

1. A lower leg for a suspension fork comprising:
   two tubes, with each tube having an end region including a receptacle device for receiving a stanchion tube mounted in the receptacle device for displacement in a displacement direction;
   front and rear stabilizers connecting the end regions of the two tubes, wherein the front stabilizer runs substantially in front of and the rear stabilizer runs substantially behind the two tubes; and
   two stiffening devices connecting the front and rear stabilizers to one another, with the two stiffening devices extending in the displacement direction away from the two tubes, with the two stiffening devices being spaced from each other and located intermediate the two tubes, with the front and rear stabilizers being free of interconnection intermediate the two stiffening devices, wherein each stiffening device has a connecting element, wherein the connecting element of each stiffening device comprises a web connected to the front and rear stabilizers and in each case one of the two tubes.

2. A lower leg according to claim 1, wherein the lower leg is formed from a die cast material or plastic material, with the die cast material comprising aluminium die cast material or magnesium die cast material, and with the plastic material comprising fibre-reinforced plastic or carbon.

3. A lower leg according to claim 2, wherein the lower leg is formed from the plastic material, and wherein fibres of the fibre-reinforced plastic comprise carbon fibres, glass fibres or plastic fibres.

4. A lower leg according to claim 3, wherein a fibre direction of the fibres of the fibre-reinforced plastic is substantially unidirectional, with the fibres of the fibre-reinforced plastic being oriented along the active stresses or forces.

5. A lower leg according to claim 2, further comprising at least one receptacle element for receiving an actuating line for an adjusting mechanism or a brake device.

6. A lower leg according to claim 5, wherein the receptacle element is arranged on the front stabilizer.

7. A lower leg according to claim 5, wherein the receptacle element is arranged on one of the two tubes.

8. A lower leg according to claim 1, wherein the connecting element further comprises a connecting bridge extending between the front and rear stabilizers spaced in the displacement direction away from each web opposite to the two tubes.

9. A lower leg according to claim 8, wherein each connecting element has front and rear connecting elements abutting with each other, with the front connecting element being formed with the front stabilizer and with the rear connecting element being formed with the rear stabilizer.

10. A lower leg according to claim 1, wherein the connecting element further comprises a connecting wire extending between the front and rear stabilizers spaced in the displacement direction away from each web opposite to the two tubes.

11. A lower leg according to claim 10, wherein each connecting element has front and rear connecting elements abutting with each other, with the front connecting element being formed with the front stabilizer and with the rear connecting element being formed with the rear stabilizer.

12. A lower leg according to claim 11, wherein the connecting element further comprises another connecting wire extending from a location where the front and rear connecting elements abut and the connecting wire, with the connecting wire and the other connecting wire stretched as a lattice.

13. A lower leg according to claim 1, wherein intermediate portions of the front and rear stabilizers intermediate the two stiffening devices and the two tubes extend outwardly away from each other relative to portions of the front and rear stabilizers connecting the end regions of the two tubes.

14. A lower leg according to claim 13, wherein the intermediate portions of the front and rear stabilizers have an extent from the two tubes multiple times greater than a diameter of each of the two tubes.

15. A lower leg according to claim 1, wherein each of the two tubes have annular cross sections perpendicular to the displacement direction.

16. A lower leg for a suspension fork comprising:
two tubes, with each tube having an end region including a receptacle device for receiving a stanchion tube mounted in the receptacle device for displacement in a displacement direction;
front and rear stabilizers connecting the end regions of the two tubes, wherein the front stabilizer runs substantially in front of and the rear stabilizer runs substantially behind the two tubes; and
two stiffening devices connecting the front and rear stabilizers to one another, with the two stiffening devices extending in the displacement direction away from the two tubes, with the two stiffening devices being spaced from each other and located intermediate the two tubes, with the front and rear stabilizers being free of interconnection intermediate the two stiffening devices, wherein each stiffening device has a connecting element, wherein the connecting element of the stiffening devices comprises webs which have a smallest height of at least 0.5 mm.

17. A lower leg according to claim 16, wherein the lower leg is formed from a die cast material or plastic material, with the die cast material comprising aluminium die cast material and magnesium die cast material, and with the plastic material comprising fibre-reinforced plastic and carbon.

18. A lower leg according to claim 17, wherein the lower leg is formed from the plastic material, and wherein fibres of the fibre-reinforced plastic comprise carbon fibres, glass fibres and plastic fibres.

19. A lower leg according to claim 16, wherein each of the two tubes have annular cross sections perpendicular to the displacement direction.

20. A lower leg for a suspension fork comprising:
two tubes, with each tube having an end region including a receptacle device for receiving a stanchion tube mounted in the receptacle device for displacement in a displacement direction;
front and rear stabilizers connecting the end regions of the two tubes, wherein the front stabilizer runs substantially in front of and the rear stabilizer runs substantially behind the two tubes; and
two stiffening devices connecting the front and rear stabilizers to one another, with the two stiffening devices extending in the displacement direction away from the two tubes, with the two stiffening devices being spaced from each other and located intermediate the two tubes, with the front and rear stabilizers being free of interconnection intermediate the two stiffening devices, wherein each stiffening device has a connecting element, wherein the connecting element of the stiffening devices comprises webs which have a smallest height of less than 50 mm.

21. A lower leg according to claim 20, wherein each of the two tubes have annular cross sections perpendicular to the displacement direction.

22. A lower leg for a suspension fork comprising:
two tubes, with each tube having an end region including a receptacle device for receiving a stanchion tube mounted in the receptacle device for displacement in a displacement direction;
front and rear stabilizers connecting the end regions of the two tubes, wherein the front stabilizer runs substantially in front of and the rear stabilizer runs substantially behind the two tubes; and
two stiffening devices connecting the front and rear stabilizers to one another, with the two stiffening devices extending in the displacement direction away from the two tubes, with the two stiffening devices being spaced from each other and located intermediate the two tubes, with the front and rear stabilizers being free of interconnection intermediate the two stiffening devices, wherein each stiffening device has a connecting element, wherein the connecting element of the stiffening devices comprises webs which comprise first and second regions, with the second regions being thicker than the first regions, with the second regions being provided in regions of the webs in which greater stresses or loads occur during riding and the first regions being provided in regions of the webs in which smaller stresses or loads occur during riding.

23. A lower leg according to claim 22, wherein a width of the connecting element of the stiffening devices or a width of the second regions of the connecting elements of the stiffening devices is at least 0.5 mm.

24. A lower leg according to claim 23, wherein the width of the connecting element of the stiffening devices or the width of the second regions of the connecting elements of the stiffening devices is less than 10 mm.

25. A lower leg according to claim 22, wherein a width of the connecting element of the stiffening devices and a width of the second regions of the connecting elements of the stiffening devices is at least 0.5 mm.

26. A lower leg according to claim 25, wherein the width of the connecting element of the stiffening devices and the width of the second regions of the connecting elements of the stiffening devices is less than 10 mm.

27. A lower leg according to claim 22, wherein each of the two tubes have annular cross sections perpendicular to the displacement direction.

28. A lower leg for a suspension fork comprising:
two tubes, with each tube having an end region including a receptacle device for receiving a stanchion tube mounted in the receptacle device for displacement in a displacement direction;
front and rear stabilizers connecting the end regions of the two tubes, wherein the front stabilizer runs substantially in front of and the rear stabilizer runs substantially behind the two tubes; and
two stiffening devices connecting the front and rear stabilizers to one another, with the two stiffening devices extending in the displacement direction away from the two tubes, with the two stiffening devices being spaced from each other and located intermediate the two tubes, with the front and rear stabilizers being free of interconnection intermediate the two stiffening devices, wherein each stiffening device has a connecting element, wherein the connecting element of the stiffening devices comprises webs having recesses or passages in the webs, with the recesses or passages provided in regions of the webs in which smaller stresses or loads occur during riding.

29. A lower leg according to claim 28, wherein each of the two tubes have annular cross sections perpendicular to the displacement direction.

30. A lower leg for a suspension fork comprising:
two tubes, with each tube having an end region including a receptacle device for receiving a stanchion tube mounted in the receptacle device for displacement in a displacement direction;
front and rear stabilizers connecting the end regions of the two tubes, wherein the front stabilizer runs substantially in front of and the rear stabilizer runs substantially behind the two tubes; and
two stiffening devices connecting the front and rear stabilizers to one another, with the two stiffening devices extending in the displacement direction away from the two tubes, with the two stiffening devices being spaced from each other and located intermediate the two tubes, with the front and rear stabilizers being free of interconnection intermediate the two stiffening devices, wherein each stiffening device comprises a connecting bridge extending between the front and rear stabilizers and spaced in each case in the direction away from one of the two tubes.

31. A lower leg according to claim 30, wherein each of the two tubes have annular cross sections perpendicular to the displacement direction.

* * * * *